BINARY DATA DETECTION SYSTEM

Filed Jan. 4, 1963

3 Sheets-Sheet 1

INVENTORS
LEONARD H. THOMPSON
ALFRED BRUNSCHWEIGER, DECEASED
BY MARY E. BRUNSCHWEIGER, EXECUTRIX

BY Robert W Berray
ATTORNEY

United States Patent Office 3,217,183
Patented Nov. 9, 1965

3,217,183

BINARY DATA DETECTION SYSTEM

Leonard H. Thompson, Poughkeepsie, N.Y., and Alfred Brunschweiger, deceased, late of Poughkeepsie, N.Y., by Mary Eileen Brunschweiger, executrix, Oswego, N.Y., assignors to International Business Machines Corporation, New York, N.Y., a corporation of New York Filed Jan. 4, 1963, Ser. No. 249,529
8 Claims. (Cl. 307—88.5)

This invention relates to a binary data detection system, and, more particularly, to a means for recovering binary information from electrical signals representing the binary information in the form of phase modulated signals.

Various techniques have been developed for representing and magnetically recording binary information. It is well-known in the art that binary 1's and binary 0's can be represented by any means which will provide two distinguishable states. One form of binary representation is to provide discrete pulses at timed intervals, the binary information being represented by the presence or absence of a pulse, or pulses of opposite polarity. One form of magnetic record utilizing this technique is shown in U.S. Patent 2,436,829, "Bipolar Magnetic Control Record" by R. I. Roth issued March 2, 1948. This patent shows the representation of binary information on a magnetic record medium wherein the binary information is distinguished by determining the direction of magnetization or polarity of discrete magnetic spots on a record medium.

Another means of representing binary information is shown in U.S. Patent 2,774,646, "Magnetic Recording Method" by B. E. Phelps issued December 18, 1956. This shows a binary storage system wherein a magnetizable medium is continuously magnetized in one direction or the other. This magnetic recording technique has become known as a non-return to zero (NRZ or NRZI), distinguishable from the previously mentioned return to zero (RZ) technique in that the magnetic medium is never at zero magnetization. The binary information is stored or represented by causing the binary information to effect a reversal of the magnetization on the record medium. One technique would cause the polarity of magnetization of the record medium to be reversed for each binary "1" to be recorded. Another form of NRZ recording is to cause the magnetic polarization to be reversed whenever the recorded information changes from a binary "1" to a binary "0" or vice versa. This same technique could be used, if desired, in an electrical system wherein a change in the polarity, or voltage level, of an electrical signal would be detected to represent the binary information.

Increased data processing speeds and the resulting need for higher density magnetic recording renders the above techniques less desirable because of timing tolerances and increasing unreliability due to noise. Because of the noise and timing requirements, another technique for representing binary information, either magnetically recorded or electrically transmitted, is becoming increasingly popular. This technique is shown in U.S. Patent 2,734,186, "Magnetic Storage Systems" by F. C. Williams issued February 7, 1956. This patent shows a recording technique which has become known as "phase modulation." It is a form of non-return to zero representation of binary information, but control of the flux or electrical signal change is different. In a magnetic storage system using phase modulation techniques, each binary bit cell experiences a change in polarity at the center of the bit cell. The direction of the polarity change represents the binary information. For example, a binary "1" would be represented by a change from the positive magnetization to a negative magnetization at the center of a bit cell, and a binary "0" would be represented by a change in magnetization from a negative magnetization to a positive magnetization. In other words, if an electrical signal were produced having a direct correspondence to the flux pattern on the magnetic medium, and this electrical signal were compared to a reference signal, the electrical signal representing the binary information would be in phase or out of phase with the reference depending on the binary information represented.

A desirable feature of phase modulation techniques is that self clocking of the binary information can be achieved. Since each binary bit cell has a change in state at the center, the change will be detected at the same frequency as the binary information originally recorded. An electrical pulse generated as a result of the flux change at the center of each bit cell can be utilized to produce an electrical wave whose frequency and phase can be initiated by the binary data. The reference phase thus generated can subsequently be utilized to determine the phase of the electrical signal derived from magnetic information.

Some prior art techniques have been devised for reproducing and detecting binary information utilizing phase modulation. These systems have taken advantage of the self clocking feature to provide a reference pulse which is applied to electrical signals derived from the magnetic information to sample the polarity of the electrical signal at precise intervals. While these systems provide means for detecting megnetically stored information at higher densities than the RZ or NRZ systems, they still experience difficulties at very high densities. At very high densities, mechanical tolerances are critical so that slight variations in speed of the record medium can cause rapid time displacement of the reproduced electrical signal such that polarity sensing may produce an erroneous signal. Further, in high density recording, the spacing between the reproducing transducer and the record medium becomes critical. Irregularities in the record medium or in the record guiding system may cause excessive separation such that an electrical signal representing a flux change may not be detected. This again would result in an error condition for prior art systems.

It is accordingly an object of the present invention to provide an improved binary data detection system capable of higher frequency operation and greater reliability.

A further object of the present invention resides in the provision of an improved binary data detection system utilizing a phase modulation technique to represent binary data.

A still further object of the present invention resides in the provision of an improved binary data detection system utilizing phase modulated information having an improved signal to noise ratio.

Another object of the present invention resides in the provision of a data detection system utilizing phase modulated representations of the binary data wherein greater variations in time displacement between adjacent signal pulses representing the binary information can be tolerated.

Another object of this invention is the provision of a novel binary data detection system utilizing phase modulated techniques for representing the binary data wherein loss of some of the data representing signals can be tolerated without disturbing the proper operation of the system.

These and other objects, features and advantages of the present invention are obtained in a preferred embodiment thereof providing a phase modulated alternating electrical signal representing binary information. The alternating electrical signal is then applied to means for producing an alternating reference signal having the same frequency and synchronized with the data representing electrical signal. The alternating reference signal has a constant phase. Means are provided for combining the data representing electrical signal and the reference signal to obtain an output signal indicating the phase relationship between the electrical signal and the reference signal. The phase indicating signal is then utilized at an output device to provide a binary data representing signal having more familiar characteristics. The binary data will be represented by the presence or absence of pulses, or a binary representing signal having either of two voltage levels. Further means are connected to the signal combining means for periodically resetting the combining means to a reference level under control of the alternating reefrence signal.

The foregoing and other objects, features and advantages of the invention will be apparent from the following more particular description of a preferred embodiment of the invention, as illustrated in the accompanying drawings.

*General description*

The general purpose of this invention is to detect binary information represented by an electrical signal which has been phase modulated in accordance with the binary information. The detection system must be capable of determining that the electrical signal has one phase or a complementary phase, 180 degrees out of phase with said one phase. Put in other words, the detection system must be capable of indicating, within a particular binary information cell, whether the signal changes from a negative to a positive polarity or whether the electrical signal changes from a positive to a negative polarity.

Figure 1:
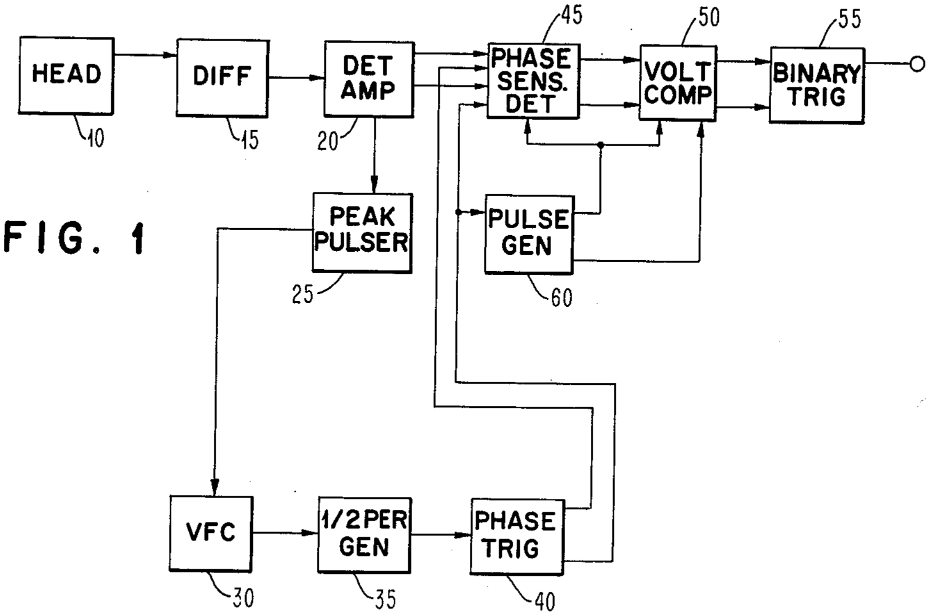
FIGURE 1 is a block diagram of all the operative elements of the phase modulated binary data detection system.

In FIGURE 1, elements 10, 15, and 20 are effective to ultimately produce an electrical signal which is phase modulated in accordance with binary data. Elements 25, 30, 35, and 40 are effective to produce an alternating reference signal. The reference signal has a constant phase and is synchronized with, and has the same frequency as, the phase modulated electrical signal. Element 45 is utilized to combine the phase modulated electrical signal and the reference signal to produce an output indicative of the phase relationship between the phase modulated electrical signal and the reference signal. Elements 50 and 55 are a combination of output means for producing a variety of output signals indicative of the binary information. The output signals can take the form of two-level voltages, or the presence or absence of pulses. Element 60 is responsive to the reference signal and is operative to produce a pulse to reset the combining means 45 at the end of each bit cell. Element 60 is also effective to provide a pulse-type output indicative of the binary information.

Figure 4:
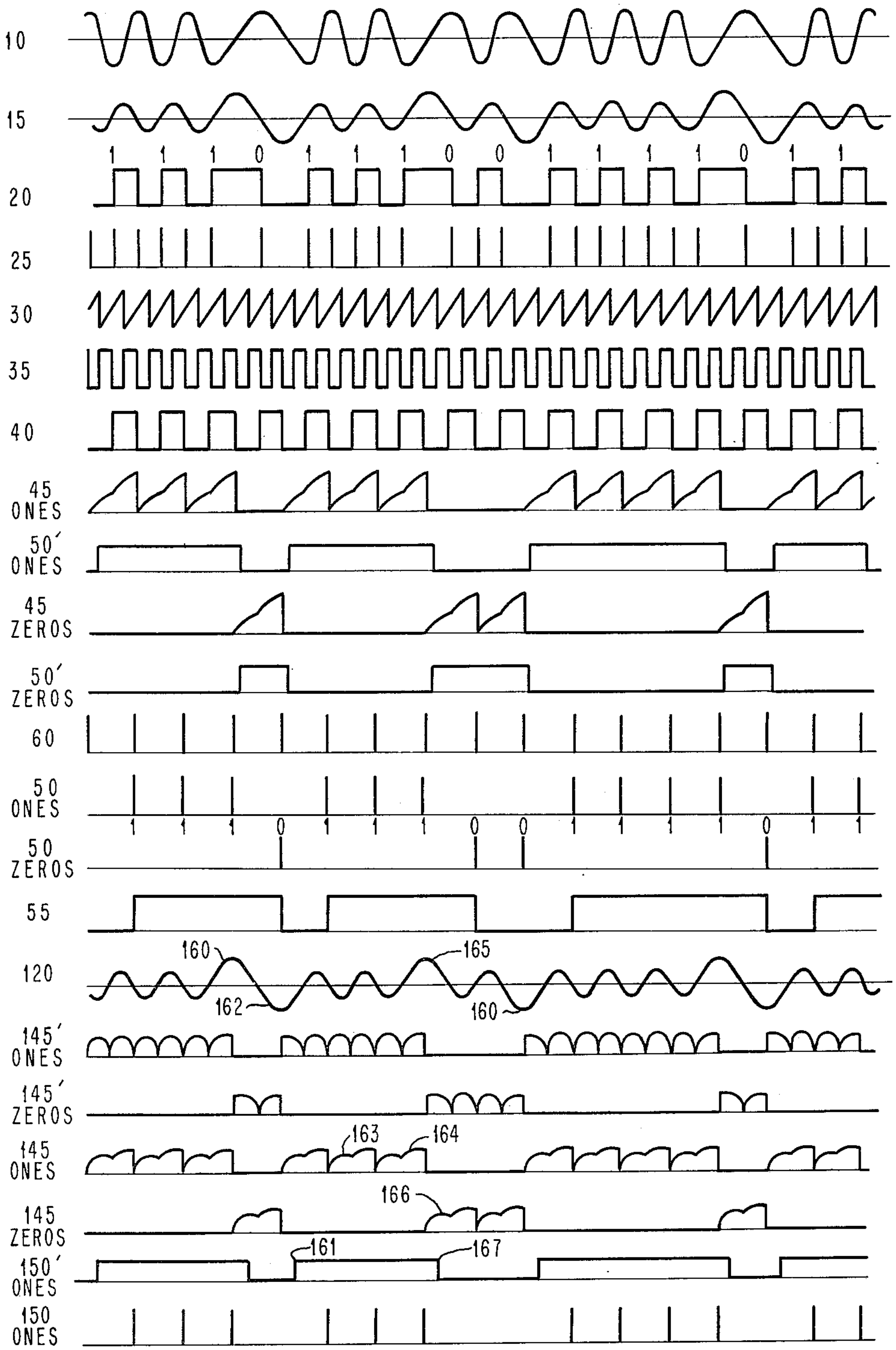
FIGURE 4 shows various wave forms generated during the operation of the elements of FIGURE 1.

In the detailed discussion to follow, reference should be made to FIGURE 4 which shows wave forms associated with elements of FIGURE 1. The wave forms have been numbered to correspond with the element in FIGURE 1 producing the wave form.

*Electrical data signal*

When a magnetized record medium is moved past a reproducing head 10, an electrical signal is produced which is a differentiation of the flux pattern on the record medium. The head 10 output is applied to a differentiator 15 which produces an output signal having zero crossings corresponding to the peaks of the signal from head 10. The differentiator 15 output is amplified and clipped in amplifier 20 to produce an alternating electrical signal which corresponds to the magnetization of the record medium and is phase modulated in accordance with the binary information.

While the alternating electrical signal 20 of FIGURE 4 is shown to have been developed from magnetically recorded information, it is apparent that the same signal could be developed from any suitable means such as a transmission system which provides a phase modulated electrical signal in response to binary information. The binary information conveyed by the phase modulated electrical signal 20 is shown above the wave form. Wave form 20 of FIGURE 4 shows that the electrical signal changes polarity at least once during each binary bit cell. For example, a binary "1" is represented by a polarity change from negative to positive, and a binary "0" is represented by a polarity change from positive to negative. The amplifier 20 of FIGURE 1 is shown to be producing two outputs to a phase sensitive detector 45. The outputs of amplifier 20 are complementary outputs, 180 degrees out of phase.

*Alternating reference signal*

In FIGURE 1, an output is taken from amplifier 20 and applied to a peak pulser 25. Peak pulser 25 is any suitable means which will generate an output pulse for each zero crossing of the wave form 20 of FIGURE 4. Each pulse produced by peak pulser 25 occurs at the zero crossings of wave forms 20 and 15 and corresponds to the voltage peak of wave form 10 obtained from reproducing head 10. The output pulses of peak pulses 25 are applied to a variable frequency clock 30. The variable frequency clock 30 is a free running sawtooth generator described in detail in the assignee's co-pending application, Serial No. 117,176, filed June 14, 1961, now Patent No. 3,156,875 entitled "Constant Amplitude, Variable Frequency Sawtooth Generator." The variable frequency clock 30 produces a sawtooth output according to the wave form 30 of FIGURE 4. The upper and lower voltage limits of the sawtooth wave form are held constant such that no matter what the charging rate of the capacitor is, the sawtooth wave form will pass through zero potential midway between the upper and lower limits.

To control the frequency of the variable frequency clock 30 in accordance with the frequency of the alternating electrical signal representing the binary data, the peak pulses from peak pulser 25 are applied to the variable frequency clock 30 to determine whether the peak pulses 25 occur in relation to the zero crossing of the sawtooth wave form 30. As disclosed in the copending application, this relationship is utilized to change the charging rate of the capacitor to thereby change the frequency of the variable frequency clock 30.

The output of the variable frequency clock 30 is supplied to a half period generator 35 which produces a square wave output having the same frequency as the sawtooth frequency. The half period generator 35 provides an output to a phase trigger 40. The phase trigger 40 produces complementary square wave outputs synchronized with and having the same frequency as the square wave output of amplifier 20 representing the binary data. The reference signal produced by phase trigger 40 has a constant phase but can be changed in frequency in accordance with the output of the variable frequency clock 30 which is controlled in the first instance by the frequency of the electrical signal representing the binary data.

*Combining means—Phase detector*

Figure 2:
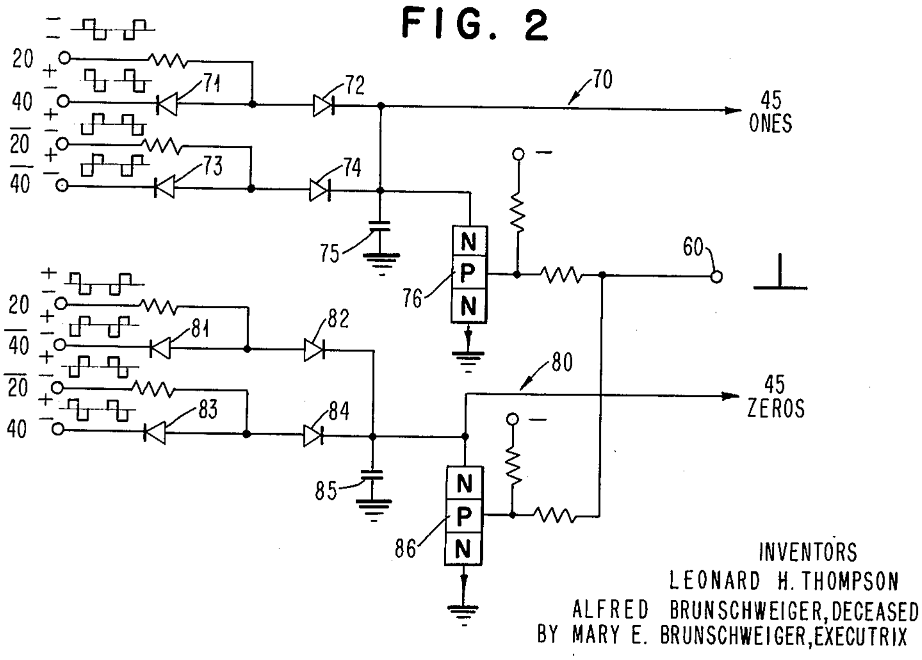
FIGURE 2 is a circuit diagram of means for combining a data signal and a reference signal to provide an indication of the phase relationship.

The complementary phase modulated electrical signals from amplifier 20 representing the binary data and the complementary reference signals 40 from phase trigger 40 are combined in a phase sensitive detector 45. Generally, the phase sensitive detector 45 will indicate the phase relationship between the phase modulated wave form 20 of FIGURE 4 and the alternating reference signal 40. As mentioned previously, the outputs of amplifier 20 are complementary and the outputs 40 of the phase trigger 40 are complementary. In FIGURE 4 only one signal from each of these devices has been shown. In FIGURE 2, which is a circuit diagram of the phase sensitive detector 45, the complementary phase modulated electrical signals 20 have been identified as the true signal 20 and the complement signal $\overline{20}$. The complementary reference signals are shown as the true signal 40 and the complement signal $\overline{40}$. Each of the signals 20 and 40 have positive and negative polarities. In other words, when the phase modulated electrical signal 20 and the reference signal 40 are in phase, the first half of the cycle will find both true signals at a positive polarity and for the second half of a cycle the complement signals will have a positive polarity. If the phase modulated electrical signal and the reference signal are out of phase, signal 20 will be at a positive polarity and signal $\overline{40}$ will be at a positive polarity for one half cycle and for the second half cycle the complement $\overline{20}$ of the phase modulated electrical signal will be at a positive polarity and the true reference signal 40 will be at a positive polarity.

In FIGURE 2 there is shown a detailed circuit diagram of the phase sensitive detector 45 of FIGURE 1. The phase detector 45 consists of a first translating path noted generally by the numeral 70 and a second translating path indicated generally by the numeral 80. Path 70 will produce an output 45 ONES indicative of the amplitude of the phase modulated electrical signal 20 when the signal is representing a binary "1" and translating path 80 will produce an output 45 ZEROS indicating the amplitude of the phase modulated electrical signal 20 when the signal is representing a binary "0." Each of the translating paths 70 and 80 has associated therewith means for inhibiting the operation of the translating path when the phase modulated electrical signal 20 and the reference signal 40 have a predetermined phase relationship. These inhibiting means include diodes 71 and 72, 73 and 74, 81 and 82, 83 and 84.

Depending on the phase relationship between the phase modulated signal 20 and the reference signal 40, each translating path 70 and 80 has a means for integrating the phase modulated electrical signal 20. These integrating means include capacitors 75 and 85 respectively.

When a binary "1" is represented by the phase modulated electrical signal 20, the electrical signal 20 will be in phase with the reference signal 40. The manner in which integration by capacitor 75 is allowed, and integration by capacitor 85 inhibited, will be described with reference to the representative positive and negative wave forms at the left of FIGURE 2. Diodes 72, 74, 82, and 84 are, in effect, exclusive OR inputs to the integrating capacitors 75 and 85. In other words, only one of these diodes will be forward biased at any one time to permit integration of the electrical signal 20 by the capacitors 75 and 85. During the first half cycle of a binary "1" bit cell, diode 71 will be reverse biased by the true reference signal 40. This permits diode 72 to be forward biased by the positive electrical signal 20. Diode 73 will be forward biased by the complement of the reference signal $\overline{40}$, clamping the anode of diode 74 at a negative potential to thereby reverse bias diode 74. Diode 81 will be forward biased by the negative polarity of the complement reference signal $\overline{40}$, clamping the anode of diode 82 at a negative potential preventing charging of capacitor 85. Diode 83 will be reverse biased by the true reference signal 40, but diode 84 will be reverse biased by the negative polarity of the complement electrical signal $\overline{20}$ preventing integration by capacitor 85. Therefore, for the first half cycle of a binary "1" bit cell, only diode 72 is forward biased to permit integration of the electrical signal 20 by capacitor 75. During the second half cycle of a binary "1" bit cell, only diode 74 will be forward biased to permit further integration by capacitor 75. Diode 72 will be reverse biased by the clamping action of diode 71, diode 82 will be reverse biased by the negative polarity of electrical signal 20, and diode 84 will be reverse biased by the clamping action of diode 83. Translating path 70 therefore provides an integrated output 45 ONES shown in FIGURE 4 whenever a phase modulated electrical signal 20 represents a binary "1." For reasons to be more fully explained, the pulse generator 60 of FIGURE 1 is utilized to provide a discharge pulse 60 to the phase sensitive detector 45 at the end of each binary bit cell. This discharge pulse 60 is effective at transistors 76 and 86 to discharge capacitor 75 and 85 respectively to a reference potential.

Wave forms for a binary "0" have also been shown in connection with FIGURE 2. By means of the same clamping actions and reverse biasing actions previously discussed, only diodes 82 and 84 will be allowed to charge capacitor 85 producing the 45 ZEROS output. Diodes 72 and 74 will be effective to inhibit integration by capacitor 75.

*Voltage comparator—Output means*

In FIGURE 1, the 45 ONES and the 45 ZEROS outputs of the phase sensitive detector 45 are applied to a voltage comparator 50 which is effective to determine which of the outputs of phase detector 45 is at a greater potential. As shown in FIGURE 4, at wave forms 50′ ONES and 50′ ZEROS, the voltage comparator 50 can provide two-level outputs representing the binary information. To be explained in detail in connection with FIGURE 3, the voltage comparator 50 is a bistable device which maintains one stable state during the presence of binary "1's" and switches to the opposite stable state when binary "0's" are detected. The voltage comparator 50 is basically cross-coupled Schmitt triggers capable, for example, of switching from the stable state representing a binary "1" to a stable state representing binary "0" when the output of phase sensitive detector 45 shows a greater potential on the 45 ZEROS output than on the 45 ONES output. In the same manner the stable state of voltage comparator 50 representing a binary "0" will switch to the stable state representing a binary "1" when the 45 ONES output of phase sensitive detector 45 shows a greater potential than the 45 ZEROS output.

Figure 3:
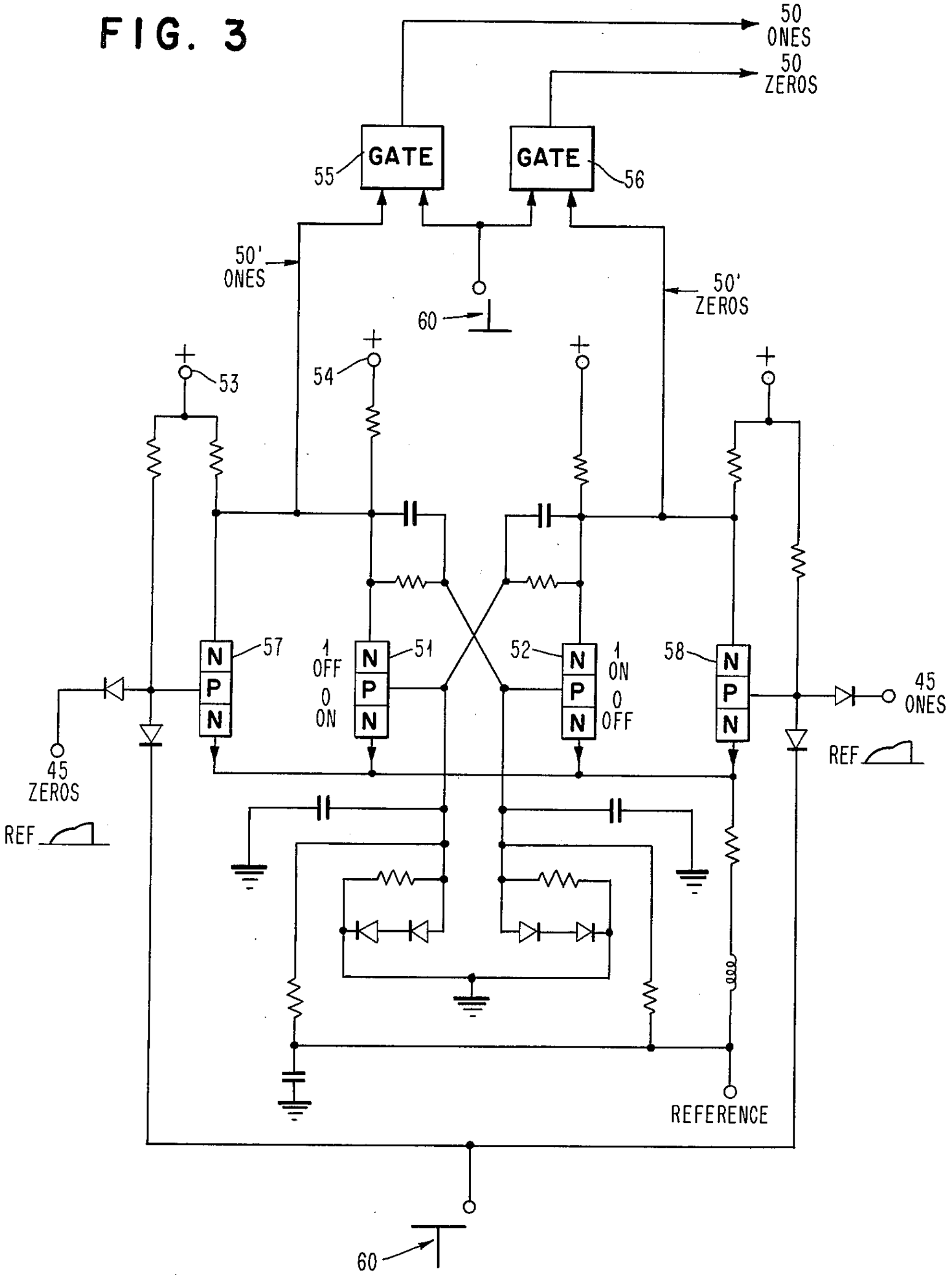
FIGURE 3 is a circuit diagram of output means responsive to the combining means of FIGURE 2 for providing a two-level output signal representative of binary data.

With reference to FIGURE 3, a detailed description of the voltage comparator 50 follows. Transistors 51 and 52 assume complementary bistable states in accordance with the binary information represented. For example, if the voltage comparator is representing a binary "1," transistor 51 will be OFF and transistor 52 will be ON. In this situation, line 50′ ONES and the corresponding wave form on FIGURE 4 will be at a relatively positive potential in accordance with the positive potential divided between terminals 53 and 54. When a binary "1" is represented by the voltage comparator 50, transistor 52 is ON placing the line labeled 50′ ZEROS and the corresponding wave form in FIGURE 4 at the relatively negative REFERENCE potential through the low resistance path of transistor 52. At the end of a binary bit cell, as previously mentioned, pulse generator 60 generates a pulse which was effective to discharge capacitors 75 and 85 of FIGURE 2. At this instant in time, the stable state of transistors 51 and 52 is sampled at gates 55 and 56 to provide pulse type outputs indicative of the binary information. These are the outputs of FIGURE 3, and the corresponding wave forms of FIGURE 4 labeled 50 ONES and 50 ZEROS. To insure that transistors 51 and 52 cannot inadvertently be switched before gates 55 and 56 are sampled, the same pulse 60, inverted, is applied to transistors 57 and 58. Transistors 57 and 58 are the input means by which the stable state of transistors 51 and 52 and thus the output of voltage comparator 50 is switched. A negative pulse applied to the base of transistors 57 and 58 will be effective to insure that these transistors do not conduct at the instant of the capacitor discharges in FIGURE 2.

Immediately after the pulse from pulse generator 60 (at which time the phase sensitive detector has been reset to initiate the sampling of another bit cell) either transistor 57 or 58 will be subjected to an increasingly positive potential at its base depending upon whether the phase sensitive detector 45 is detecting binary "1's" or binary "0's." Assuming the voltage comparator 50 is representing a binary "1" and that the 45 ONES input is increasing in amplitude from the reference potential, transistor 58 will start conducting. The only effect this has on the overall circuit is to make the collectors of transistors 52 and 58 become more negative. This negative change in potential will be applied to the base of transistor 51. The only effect the negative change in potential has at the base of transistor 51 is to further insure that transistor 51 is non-conducting or OFF. Therefore when the voltage comparator 50 is representing a binary "1" and subsequently receives another binary "1" indication, the stable state of transistors 51 and 52 is not changed.

Again assume that a binary "1" is represented by the voltage comparator 50 and that gate 55 has produced a pulse output indicating a binary "1" and that the phase is sensitive detector 45 has been returned to the reference potential. If a binary "0" is now detected by the phase sensitive detector 45, 45 ZEROS input will rise from the reference potential causing transistor 57 to start conducting. Conduction of transistor 57 causes a negative change in potential at its collector which is differentiated and applied as a negative change in potential to the base of transistor 52. A negative potential applied to the base of transistor 52 tends to turn transistor 52 OFF. As transistor 52 attempts to turn OFF, its collector potential starts to rise and this rise in potential is applied to the base of transistor 51 to start to turn transistor 51 ON. As transistor 51 attempts to turn ON, its collector potential becomes more negative, and is applied to the base of transistor 52 aiding in the turn OFF of transistor 52. The cross-coupling action between transistors 51 and 52 provides a rapid switching of the stable states of transistors 51 and 52. By the end of the bit cell in which a binary "0" is detected, transistor 51 will be ON and transistor 52 will be OFF causing the 50′ ZEROS line to be at a relatively positive potential and the 50′ ONES line to be at a relative negative potential. At the end of the bit cell, when pulse generator 60 produces a pulse, gate 56 will be conditioned to produce an output pulse on the 50 ZEROS line.

*Pulse generator*

As previously mentioned, pulse generator 60 of FIGURE 1 is responsive to the reference signal 40 and is effective to produce an output pulse at the end of each binary bit cell. This output pulse is effective at the phase sensitive detector 45 to reset the phase sensitive detector or discharge the capacitors 75 and 85 of FIGURE 2. The pulse is also effective at the voltage comparator 50 to insure that transistors 57 and 58 of FIGURE 3 remain nonconductive during the time that the same pulse from pulse generator 60 is applied to gates 55 and 56 to produce pulse outputs representing the binary data.

Several types of outputs can be obtained from the detection circuit shown in FIGURE 1. The two-level signals produced on the 50′ ONES or 50′ ZEROS line from voltage comparator 50 could be used. In a data processing system utilizing magnetic recordings it is more likely that the state of voltage comparator 50 would be sampled by the pulse generator 60 to provide pulse and no pulse conditions indicative of the binary information. This is a more desirable type of output so that the detected information can be entered into a storage register or buffer system represented in FIGURE 1 by binary trigger 55. The application of pulses from voltage comparator 50 to the binary trigger 55 produces the wave from 55 in FIGURE 4.

*Features of the invention*

*Low amplitude read signal.*—The last seven wave forms of FIGURE 4 represent the operation of the binary detection system when, for some reason, the output from head 10 of FIGURE 1 is not at its maximum value. Wave form 120 represents the output of amplifier 20 which did not receive an input signal of sufficient amplitude to provide a clipped signal such as wave form 20. The zero crossings of wave form 120 will be sufficient to generate peak pulses from peak pulser 25 to control generation of the alternating reference signal. Wave forms 145′ ONES and 145′ ZEROS represent the potentials which would cause integration by capacitors 75 and 85 of the phase sensitive detector 45 shown in FIGURE 2. With a full amplitude signal at the input of phase detector 45, this wave form would normally be a square wave without the alternating input. Since the alternating wave form 20 representing the binary data does not have as great an amplitude as before, the capacitors 75 and 85 will not produce an integrated output as great as in the normal condition. The voltage comparator 50 of FIGURE 1 and FIGURE 3 will operate in the same manner, but a longer period of the binary bit cell will be required to reach a potential above the reference voltage to cause transistors 51 and 52 to change their stable state. This is shown by the wave form 150′ ONES which changes stable state later in the bit cell than the corresponding wave form 50′ ONES in FIGURE 4. Even so, pulses from pulse generator 60 will sample the voltage comparator 50 at the end of the bit cell and provide the identical pulse outputs 150 ONES as produced under normal conditions.

*Signal dropout.*—Though wave form 120 of FIGURE 4 is not accurately drawn, it is evident that certain portions of wave form 120 provide a greater amplitude signal than other portions. These greater amplitude peaks, such as at 160, occur when the head 10 is reproducing the flux change between adjacent bit cells of differing binary information. It has been observed, that when a reproducing head 10 is reading high frequency flux changes, such as occur between adjacent bit cells of like binary information, the output signal is less than if the head is reading flux changes of a lower frequency, such as occur between bit cells of unlike binary information. If for some reason, the record medium and head 10 should be displaced, it is possible the head will not reproduce signals corresponding to the flux changes between adjacent bit cells of like binary information. However, with the same record medium and head spacing, the lower frequency flux changes will produce a signal which can be differentiated and detected to provide an electrical signal representing the change from one binary bit cell to another binary bit cell. Even with the loss of the higher frequency signals, wave form 150′ ONES and 150 ONES will be produced, assuming the irregular spacing between the record medium and head 10 does not persist longer than the stability of the variable frequency clock 30. Even though the higher frequency signals are lost, when the greater amplitude peak 160 is produced, the input logic of the phase detector 45 of FIGURE 2 will provide a high enough amplitude electrical signal 20 to the proper capacitor 75 or 85 to produce an integrated output of sufficient amplitude to cause the voltage comparator 50 to change stable state. For example, the stable state of the voltage comparator 50 would change at point 161 of wave form 150′ ONES when the greater amplitude peak 162 of wave form 120 is detected and integrated by the phase sensitive detector 45. The remainder of the binary "1" integrations 163 and 164 of wave form 145 ONES could be lost, but the voltage comparator 50 would remain in its present stable state indicating a binary "1" because the comparator 50 has not received an input on the 145 ZEROS input to switch the stable state. However, at peak 165 of wave form 120, a binary "0" integration will take place at 166 of the wave form 145 ZEROS to switch the stable state of the voltage comparator 50 such as at point 167 of wave form 150′ ONES.

Additional reliability can be achieved from the present invention when used in connection with assignee's copending application, Serial No. 159,282 filed December 14, 1961, entitled "Error Correcting System." This error correcting system utilizes the fact that when the detection system is operating properly, an integrated output will be produced from the phase sensitive detector 45 of FIGURE 1 for each binary bit cell. The error correcting circuitry is enabled and provides error correction whenever neither a 45 ONES or a 45 ZEROS output is produced from the phase sensitive detector 45. The error correction technique assumes that when a particular binary bit cell does not produce an integrated output, the binary information is doubtful and error correcting procedures are initiated in accordance with the above-mentioned copending application.

*Noise rejection.*—As previously mentioned in connection with the generation of the alternating reference signal 40, the variable frequency clock 30 of FIGURE 1 is sampled by pulses from peak pulser 25 generated at the peak of the reproduced signal from head 10. By utilizing the peaks of wave form 10 of FIGURE 4, greater clocking reliability is achieved since the peaks are less susceptible to noise problems.

Further noise rejection is accomplished by the phase sensitive detector 45 of FIGURE 1. Again, the biggest problem with noise will occur at the zero crossings of the wave form 10 of FIGURE 4. When these zero crossings are compared with the integrated wave forms of the phase sensitive detector 45 they are seen to occur either at the start of the integration or at the end of the integration. If a noise pulse should occur close to the beginning of an integration within a bit cell, the operation of the capacitors 75 and 85 is such that a high amplitude but very narrow noise spike would not be integrated sufficiently to produce a voltage level greater than the voltage level produced by the alternating electrical signal 20 being properly integrated. After this period of the integration has passed, the integrated output of the proper electrical signal 20 will have reached a value sufficient to either switch the voltage comparator 50 or prevent a noise pulse from being integrated sufficiently to affect the setting of the voltage comparator 50. The use of a resetting pulse from pulse generator 60 at the end of each binary bit cell insures that additive integrations of several noise pulses over several binary bit cells cannot take place, so that noise pulses will never reach a level sufficient to affect the voltage comparator 50.

*Peak shift.*—At very high densities, it is possible that the physical properties of the tape will change or the speed of movement of the record medium will change relative to the head 10 such that the voltage peaks of the reproduced signal 10 of FIGURE 4 may be shifted. It is an additional feature of the phase sensitive detector 45 that such a peak shift relative to the alternating reference signal 40 can occur without affecting the reliability of the detection system. Within the limits of the time constants of the integrators in the phase sensitive detector 45 shown in FIGURE 2, almost one-half a bit period phase shift can occur in the wave forms 10 and 20. As long as the polarities of the binary data representing electrical signal 20 and the reference signal 40 are in the proper combination to forward bias one of the diodes 72, 74, 82, or 84 integration can take place. As long as the peak shift does not exceed certain limits, the integrated output from the phase sensitive detector 45 will rise to a value sufficient to control the voltage comparator 50.

Although only one channel of a phase modulated binary detection system has been shown, it is apparent that several channels can be provided in a multi-track recording system. Each channel would have its own detection system as shown in FIGURE 1. As mentioned previously, the concepts used in the binary detection system, shown in relation to phase modulated magnetic recordings, can be used in any type of data processing system utilizing alternating phase modulated electrical signals representing binary information.

While the invention has been particularly shown and described with reference to a preferred embodiment thereof, it will be understood by those skilled in the art that various changes in form and details may be made therein without departing from the spirit and scope of the invention.

What is claimed is:

1. A magnetic reproducing system comprising:
means deriving an alternating electrical signal corresponding to the magnetization of a record medium having binary information stored thereon,
means responsive to said alternating electrical signal for producing an alternating reference signal having the same frequency as, and synchronized with, said electrical signal,
output means, including means for combining said electrical signal and said reference signal, for providing an output signal representing the stored binary information,
and means connected to said combining means, controlled by said reference signal, for periodically resetting said combining means.

2. A magnetic reproducing system comprising:
means deriving complementary alternating electrical signals corresponding to the magnetization of a record medium having binary information stored thereon,
means responsive to said complementary alternating electrical signals for producing complementary alternating reference signals having the same frequency as, and synchronized with, said electrical signal,
output means, including means for combining said complementary electrical signals and said complementary reference signals, for providing an output signal representing the stored binary information,
and means connected to said combining means, controlled by at least one of said reference signals, for periodically resetting said combining means.

3. A binary data detection system comprising:
a source of complementary alternating electrical signals representing binary information,
means responsive to said complementary alternating electrical signals for producing complementary alternating reference signals having the same frequency as, and synchronized with, said electrical signal,
output means, including means for combining said complementary electrical signals and said complementary reference signals, for providing an output signal representing the binary information,
and means connected to said combining means, controlled by at least one of said reference signals, for periodically resetting said combining means.

4. A magnetic reproducing system comprising:
means deriving complementary alternating electrical signals corresponding to the magnetization of a record medium having binary information stored thereon, each of said complementary electrical signals representing the binary information by having one of two opposite phases within a binary bit cell,
means responsive to said complementary alternating electrical signals for producing complementary alternating reference signals of constant phase having the same frequency as, and synchronized with, said electrical signal, means for combining said complementary electrical signals and said complementary reference signals, for indicating the phase relationship between said electrical signals and said reference signals, output means responsive to said phase indication from said combining means for providing an output signal representing the stored binary information, and means connected to said combining means, controlled by at least one of said reference signals, for resetting said combining means at the end of each binary bit cell.

5. A binary data detection system comprising:

a source of complementary alternating electrical signals representing binary information, each of said complementary electrical signals representing the binary information by having one of two opposite phases within a binary bit cell.

means responsive to said complementary alternating electrical signals for producing complementary alternating reference signals of constant phase having the same frequency as, any synchronized with, said electrical signal, means for combining said complementary electrical signals and said complementary reference signals for indicating the phase relationship between said electrical signals and said reference signals, output means responsive to said phase indication from said combining means for providing an output signal, said output signal having one of two voltage levels for representing the binary information, and means connected to said combining means, controlled by at least one of said reference signals for resetting said combining means at the end of each bit cell.

6. A binary data detection system in accordance with claim 5 wherein said combining means includes:

first and second translating paths for producing an output indicative of the amplitude of said electrical signals;

and means associated with each of said translating paths, responsive to said reference signals, for inhibiting the operation of said associated translating path when said electrical signals and said reference signals have a predetermined phase relationship.

7. A binary data detection system in accordance with claim 6 wherein said first and second translating paths each include:

means for providing an integrated output of said alternating electrical signals;

and means, responsive to said resetting means, for returning said integrated output to a predetermined reference potential.

8. A binary detection system in accordance with claim 7 wherein said output means includes:

a bistable device, one stable state of said device indicating one binary value, and the other stable state of said device indicating the other binary value, first and second input means connected respectively to said first and second translating paths of said combining means, each of said input means being responsive to a particular stable state of said bistable device and a predetermined amplitude of said integrated output signal from the said associated translating path to switch the stable state of said bistable device.

References Cited by the Examiner

UNITED STATES PATENTS 2,669,706 2/54 Gray -------------- 328—110 X

ARTHUR GAUSS, *Primary Examiner.*